(12) United States Patent
Calabria et al.

(10) Patent No.: US 7,281,496 B2
(45) Date of Patent: Oct. 16, 2007

(54) POULTRY-LOADING MACHINE

(75) Inventors: Paolo Calabria, Palazzolo S/O (IT); Eugenio Calabria, Pilzone d'Iseo (IT)

(73) Assignee: Ciemmecalabria S.r.l., Cazzago S. Martino (Brescia) (IT)

( * ) Notice: Subject to any disclaimer, the term of this patent is extended or adjusted under 35 U.S.C. 154(b) by 0 days.

(21) Appl. No.: 11/369,024

(22) Filed: Mar. 7, 2006

(65) Prior Publication Data
US 2007/0163509 A1 Jul. 19, 2007

(30) Foreign Application Priority Data
Jan. 18, 2006 (IT) .......................... MI2006A0070

(51) Int. Cl.
*B65G 15/00* (2006.01)
(52) U.S. Cl. ................. 119/845; 119/846; 119/401; 56/181; 56/184
(58) Field of Classification Search ................ 119/845, 119/846; 56/181, 184, 185
See application file for complete search history.

(56) References Cited

U.S. PATENT DOCUMENTS 5,660,147 A * 8/1997 Wills et al. ................. 119/846
6,477,987 B2 * 11/2002 Taylor ......................... 119/843
6,892,677 B1 * 5/2005 Livingston et al. ......... 119/845

FOREIGN PATENT DOCUMENTS

IT      19247 A/80      1/1980
IT      01284060        6/1996

* cited by examiner

*Primary Examiner*—Michael J. Carone
*Assistant Examiner*—Willie Berry, Jr.
(74) *Attorney, Agent, or Firm*—Nixon & Vanderhye, P.C.

(57) ABSTRACT

The invention describes a poultry-loading machine able to guide poultry into a cage, the cage having an opening and a bottom surface. The machine comprises: a main frame; a first conveyor belt for transporting the poultry from a first position into a second position, the first conveyor belt being supported by the main frame; and a second conveyor belt for transporting the poultry into the container, the second conveyor belt defining a loading belt surface. The machine also comprises a device for modifying the inclination of the second conveyor belt so that the loading belt surface is substantially parallel to the bottom of the container; and an approach frame which supports the second conveyor belt, the approach frame being able to move the second conveyor belt towards and away from the container, the second conveyor belt being displaceable so as to enter into the container and transport the poultry inside it.

10 Claims, 22 Drawing Sheets

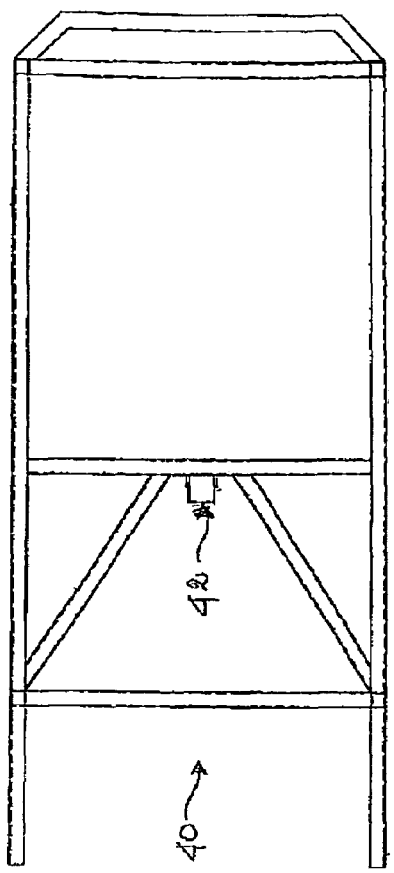
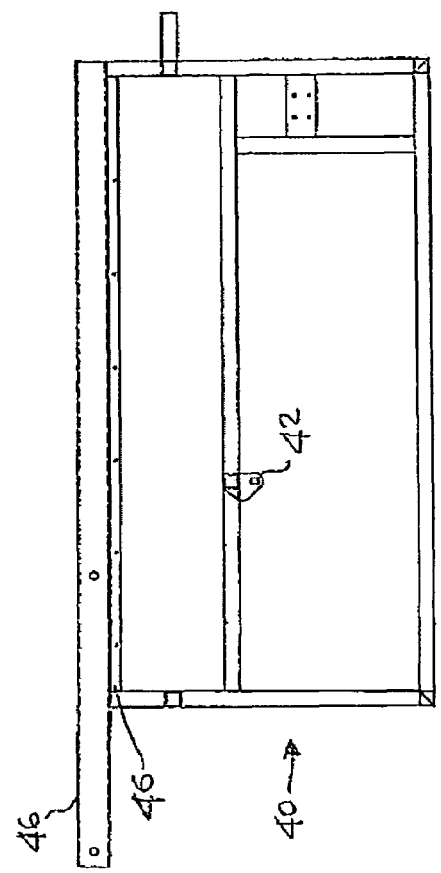
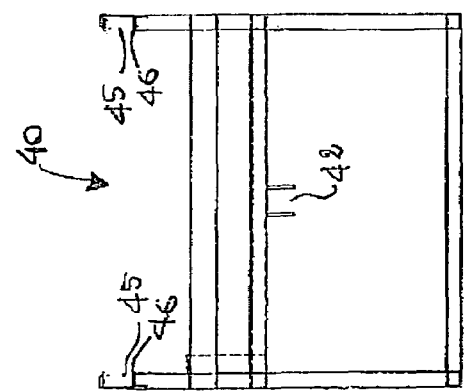
FIG. 12 C
FIG. 12 B
FIG. 12 A

POULTRY-LOADING MACHINE

BACKGROUND OF THE INVENTION

1. Field of the Invention

The present invention relates to a machine for removing poultry, in particular turkeys, from breeding sheds and introducing them into cages or hutches. Such a machine is generally referred to more briefly as a "poultry-loading machine". In the case where the poultry to be loaded are turkeys, a machine of this type is called a "turkey-loading machine".

2. Related Art and other Considerations

It is widely known that most poultry to be slaughtered is at present bred inside large sheds or the like. Inside these sheds thousands of birds are bred using very advanced breeding techniques. Intensive breeding techniques of this type make it is possible to achieve large economies of scale for the breeders which in turn results in advantages, in cost terms, for the consumers who purchase cuts of meat from animals bred in this way. Moreover, this type of intensive breeding results in a substantial uniformity of the animals bred. After a certain predefined period of time the bred poultry has reached its correct weight and is ready for slaughtering.

At the end of the breeding period, the live animals must be removed, without injuring them, from the shed where they have been bred and taken away for the next processing operations, i.e. typically transported to the slaughter house.

There therefore arises the need to remove all the animals from the breeding shed in relatively short periods of time and introduce them into cages. Once they have been closed inside the cages, they may be easily transported by a lorry or similar transportation means. The problem, as mentioned above, lies in the fact that several thousands of birds, for example turkeys, are bred inside the sheds and must be removed and introduced into cages without injuring them.

In some countries, in particular, in those countries where the cost of labour is relatively low, the operations of removing the animals and introducing them into cages are also performed manually. This is difficult, time-consuming and often results in injury to the animals. However, in most cases, the removal and caging operations are performed using special machines, commonly called "poultry-loading machines". In the specific case where the poultry consists of turkeys, these machines are called "turkey-loading machines". Unlike other birds which are bred (such as chickens or guinea fowl), turkeys have a much greater weight. An adult male turkey bred as described briefly above at present reaches a weight of about 20 kg and more.

Turkey-loading machines are, however, already known in the art.

Italian patent application No. 19247 A/80, filed on 16 Jan. 1980 in the name of Messrs Francesco Giovanni Calabria and Carlo Calabria describes a conveying apparatus for live poultry. The apparatus comprises a machine and a box for collecting the animals. Caging is performed automatically by means of a combined system of conveyor belts which introduce the animals directly into the cages.

IT01284060, filed on 24 Jun. 1996, in the name of Ciemme di Calabria F .lli S.n.c., describes a device for introducing into hutches and the like poultry in general and turkeys in particular. The device has a loading belt and, in the vicinity of the cages, an upper belt which creates a sandwich effect and forces the turkeys to lower their heads and enter into the cages.

BRIEF SUMMARY

The Applicants have perceived the need to provide a new poultry-loading machine, in particular, turkey-loading machine, which is more efficient than the known machines. In particular, the Applicants have noted that it would be desirable to provide a machine able to load poultry into cages, typically (but not necessarily) situated on the loading platform of a vehicle or a trailer, also when the cages are not positioned precisely next to the machine and when they are not arranged on a flat surface.

A poultry-loading machine is arranged to guide poultry into a container. The container has an opening and a bottom surface. The machine comprises: a main frame; a first conveyor belt for transporting the poultry from a first position close to the ground into a second position, the first conveyor belt being supported by the main frame; and a second loading conveyor belt for introducing the poultry into the container, the second conveyor belt defining a loading belt surface. The machine also comprises a device for modifying the inclination of the second conveyor belt so that the loading belt surface is substantially parallel to the bottom of the container; and an approach frame which supports the second conveyor belt, the approach frame being able to move the second conveyor belt towards and away from the container, the second conveyor belt being displaceable so as to enter, at least partially, into the container and transport the poultry inside it.

The technology will become completely clear from the detailed description which follows, to be read with reference to the accompanying figures.

BRIEF DESCRIPTION OF THE DRAWINGS

In the drawings:

FIG. 12a is a front plan view of the approach frame;

FIG. 12b is a side plan view of the approach frame;

FIG. 12c is a top plan view of the approach frame;

DETAILED DESCRIPTION

Identical reference numbers in the various figures refer to identical or functionally equivalent parts.

Machine 1 comprises a main frame 2 mounted on an axle provided with wheels 3 or tracks. According to a preferred embodiment, the machine 1 is equipped with a motor 4 for allowing it to perform small movements autonomously in the vicinity of the work area. Typically, the motor 4 also allows driving of one or more conveyor belts which will be described below. For travel over long distances, the machine 1 is preferably hitched to and towed by another vehicle or loaded onto the loading platform of a suitable transportation vehicle. For this purpose, the axle of the machine is equipped with a mechanism for rendering it idle and allowing towing.

Figure 3:
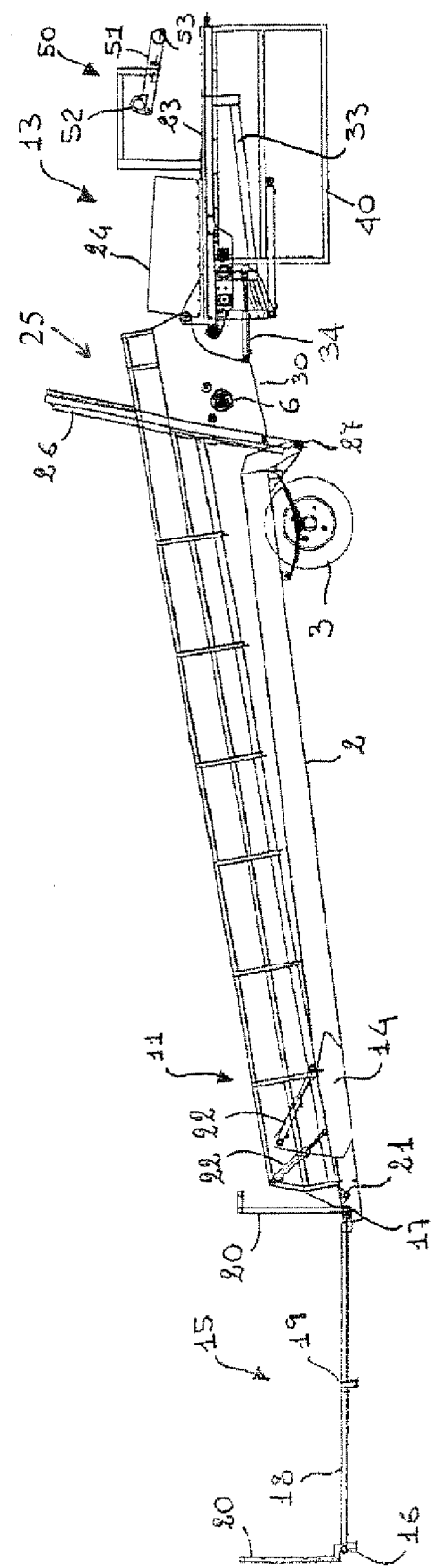
FIG. 3 is a schematic side view of a first machine in the working configuration with the front end lowered and horizontal and with the loading belt retracted.

The main frame 2 supports a main conveyor belt 5, also called conveyor belt 5. With reference to FIG. 3, at least one driving roller 6, idle roller 7 and transmission rollers about which the main conveyor belt 5 is endlessly wound are provided. The conveyor belt 5 is conventionally a plastic or rubber belt with a support structure made of fabric or the like and a non-slip external surface. Conveniently, the conveyor belt 5 has a length equal to about 100 cm. Alternatively, the belt may be at least partly metallic.

The main frame 2 supports two side walls 9 and 10 which define a conveying channel 11 for guiding the birds towards the front end 13 of the machine (which will be described below) and then towards the cages. A section of the conveyor belt 5 is able to travel inside the conveying channel 11. According to one embodiment, the conveying channel 5 is at least partly open at the top. According to another embodiment, the conveying channel 11 is closed at the top and forms a tunnel. When the front end 13 of the machine 1 is lowered, the section of the conveyor belt 5 which travels inside the conveying channel 11 is inclined at about 30° with respect to the horizontal.

At one end of the main frame 2, called "rear end" for the sake of convenience, a pick-up frame 15 is hitched. The pick-up frame 15 supports a driving roller 17 and at least one idle roller 16. Conveniently, the driving roller 17 is made to rotate by means of a (belt or chain) transmission connected to the idle roller of the conveyor belt 5. A pick-up conveyor belt 18 is wound endlessly around the driving roller 17 and at least one idle roller 16. Alternatively, it is possible to envisage an (electric or hydraulic) motor for rotating the driving roller and causing rotation of the pick-up belt 18.

Figure 1:
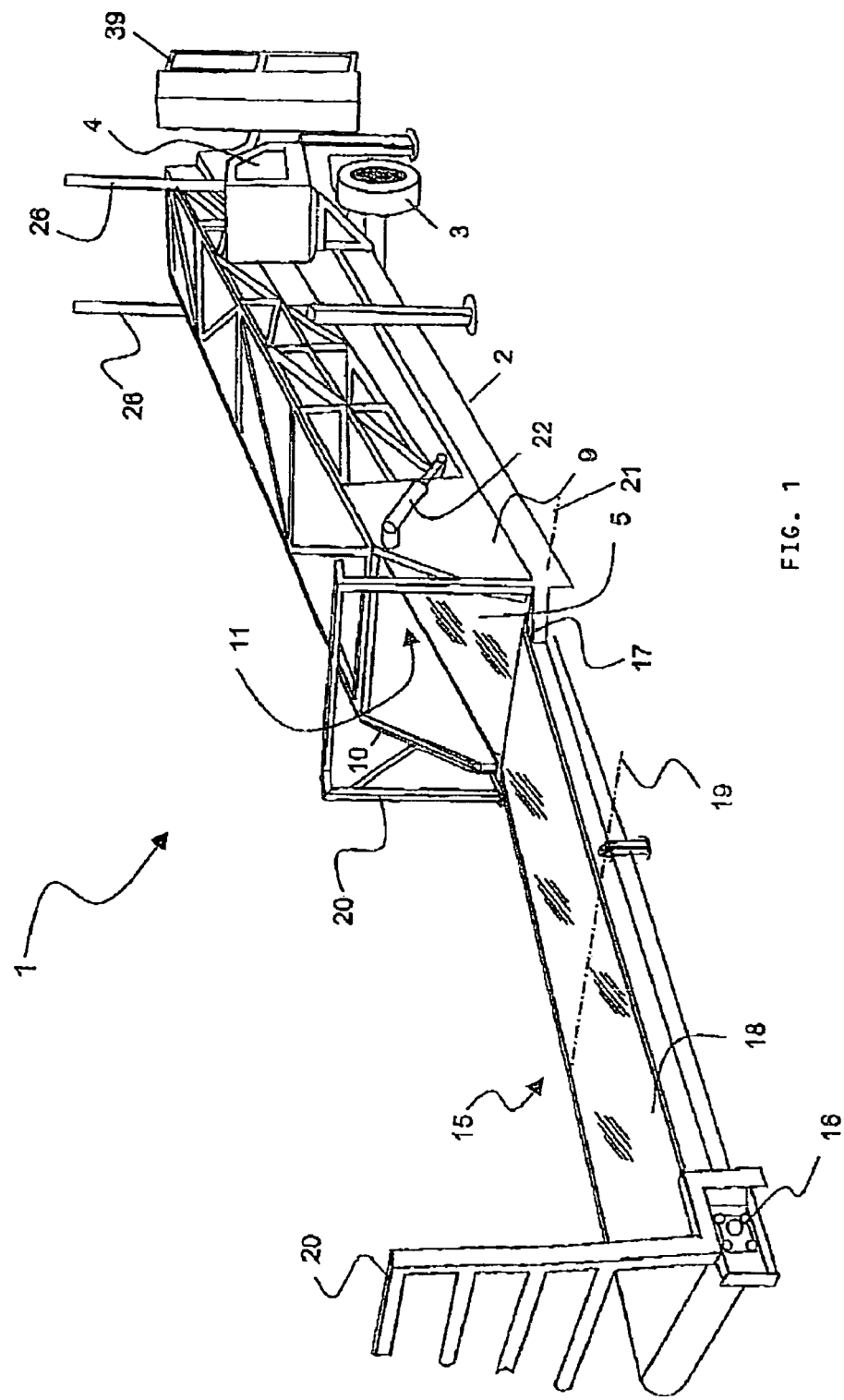
FIG. 1 is a schematic perspective view of an embodiment of the machine according to an example embodiment.

In the working configuration, the pick-up conveyor belt 18 is substantially horizontal and positioned a few centimeters from the ground. Conveniently, in the working configuration, the pick-up belt 18 defines a longitudinal axis which substantially coincides with the longitudinal axis of the conveyor belt 5. In other words, the conveyor belt 5 forms substantially an extension of the pick-up belt 18 in the working configuration (FIG. 1).

Figure 2:
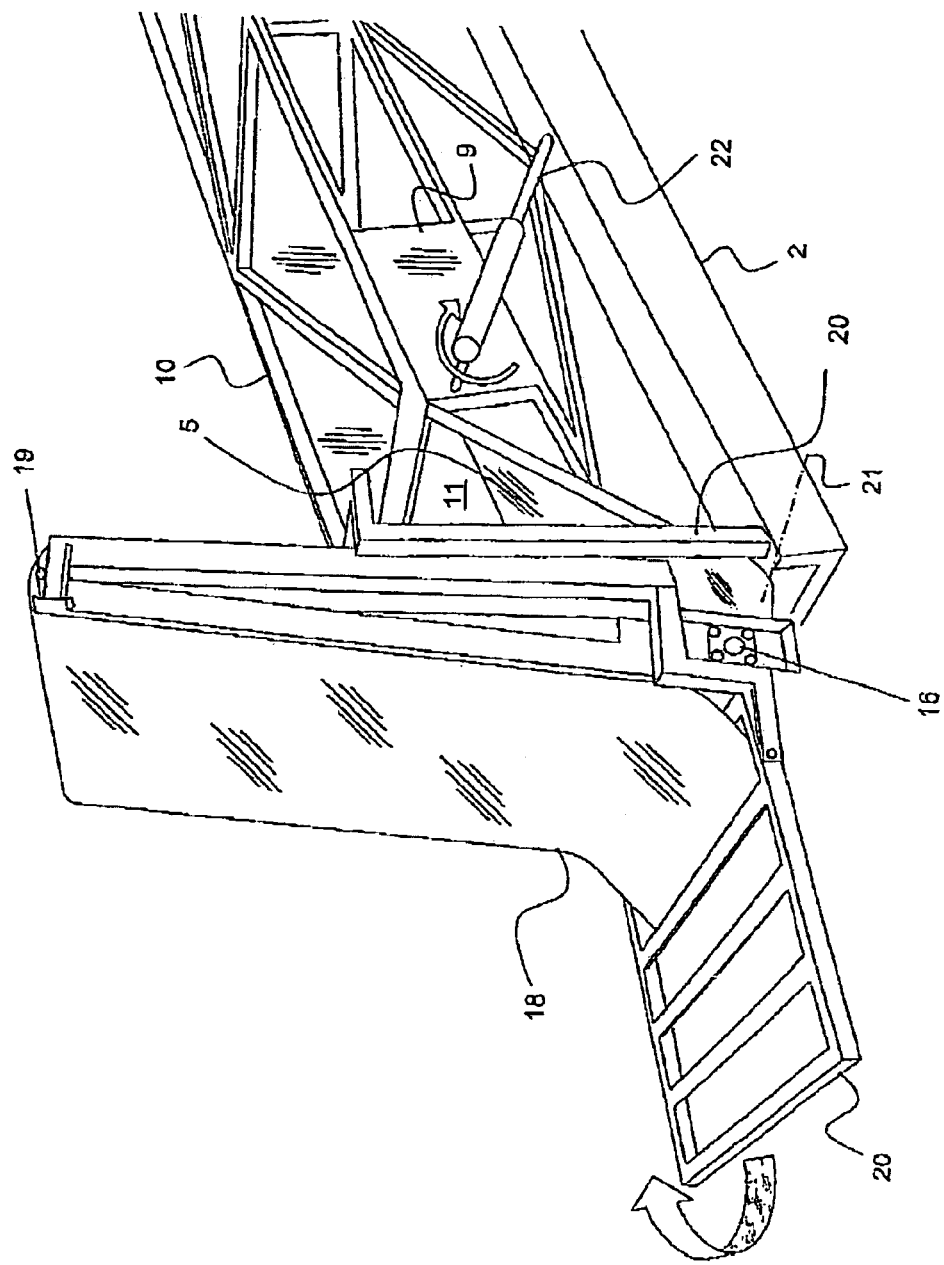
FIG. 2 is a schematic perspective view of the pick-up belt partly folded-up.

In the rest or transportation configuration (FIG. 2), the frame of the pick-up belt 18 is preferably folded up hingeably about a hinging axis 19 transverse to the longitudinal axis of the pick-up belt 18. Conveniently, folding-up hingeably allows, during transportation, a high degree of compactness. Moreover, it is easy to install.

A frame 20 is provided at the end of the pick-up belt 18, to which frame a box (not shown) is connected. The birds to be rounded up and loaded are enclosed inside the box and forced to mount the pick-up belt 18. The pick-up belt 18 is activated by means of rotation of the driving roller 17 so as to transport the birds towards the conveyor belt 5. Once the travel on the pick-up belt 18 has been completed, the birds mount (and are transported by) the conveyor belt 5 towards the front end 13.

As shown in FIG. 3, the conveying channel 11 and the conveyor belt 5 are rotatably mounted on the frame 2 at 21, close to the rear position of the main frame. Each side of the machine is provided with a plate 14 fixed to the frame 2 and two oil-hydraulic balancing pistons 22 fixed to the conveying channel 11 and to the plate 14. The balancing pistons cooperate with oil-hydraulic raising pistons 26 (which will be described below) for raising the front end 13 so that it remains inclined substantially in the same way as the bottom of the cages to be filled.

Figure 4:
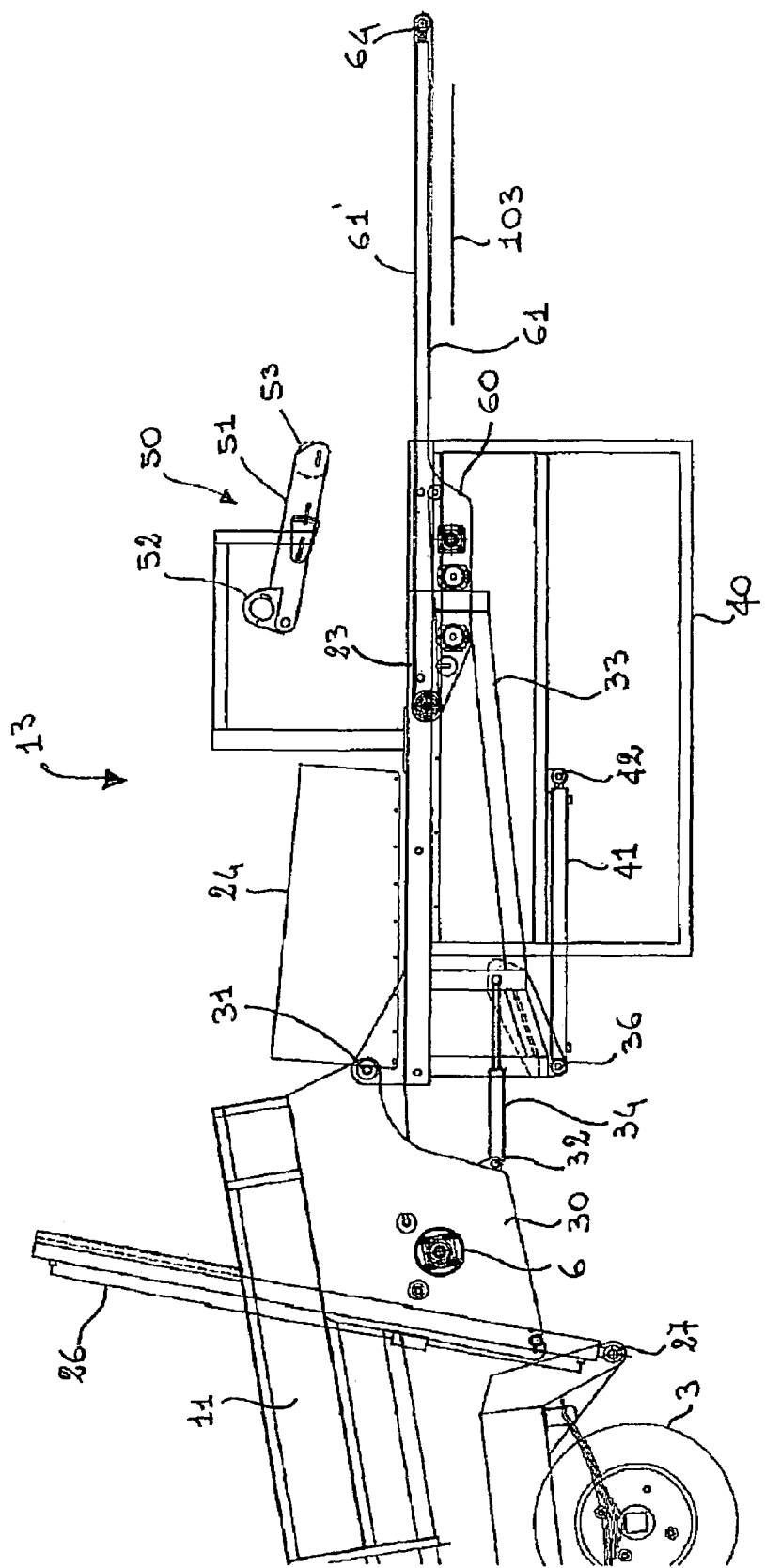
FIG. 4 is a schematic side view of the front end of the machine according to FIG. 3 in a horizontal position and with the loading belt extracted.

The front end 13 is shown in FIG. 4. In particular a section 23 of the conveyor belt 5 is envisaged as being extended at the front and projecting with respect to the main frame 2. Conveniently, a partition 24 may be envisaged, this forming substantially an extension of the conveying channel 11.

Figure 7:
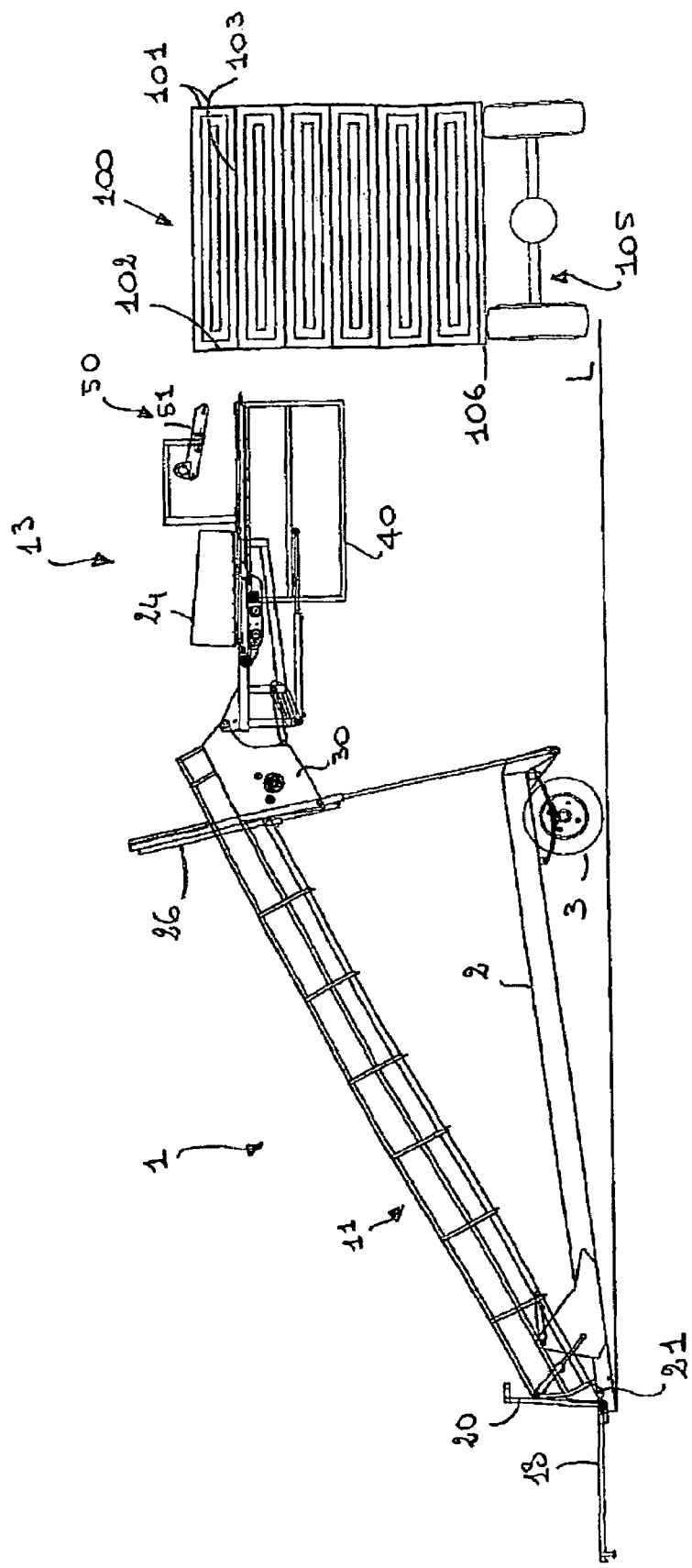
FIG. 7 is a schematic side view of the first machine in the working configuration with the front end raised and horizontal, with the loading belt retracted and with the approach frame partly extracted towards the cages.

Two oil-hydraulic raising pistons 26 able to raise the conveyor channel 11 are provided in the vicinity of the front end 25 of the main frame 2. Each raising piston 26 is hinged to the main frame 2 at a respective pivot point 27. The conveying channel 11 is instead fixed to the cylinder of the raising pistons 26. Therefore, when the raising pistons 26 are extended (see for example FIG. 7), the conveyor channel 11 is raised, rotating about the pivot 21 situated at the rear of the frame 2.

Figure 5:
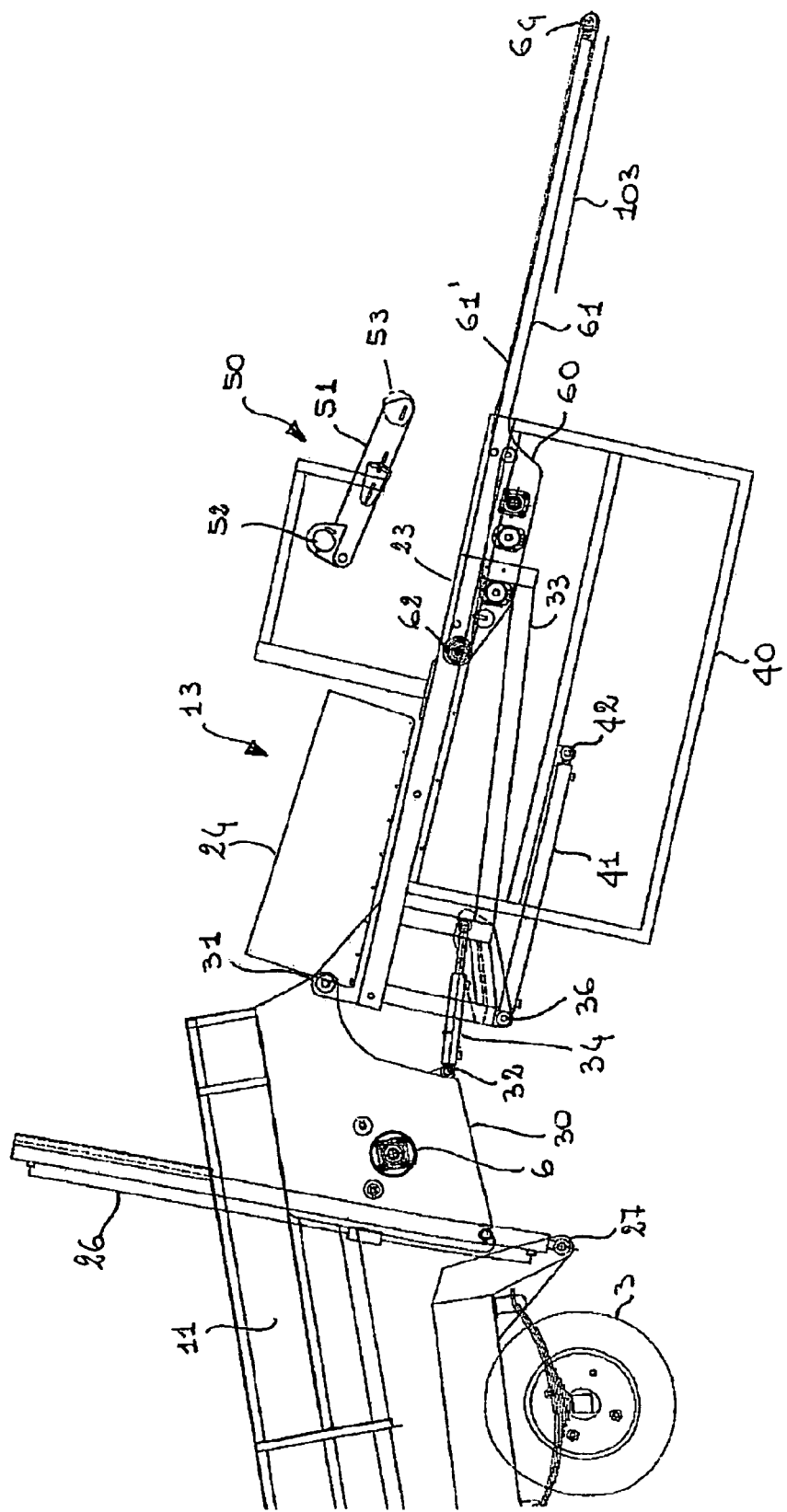
FIG. 5 is a schematic side view of the front end of the machine according to FIG. 3 inclined downwards and with the loading belt extracted.

A shaped bracket 30 is fixed (for example welded or bolted) onto a respective raising piston 26. Each shaped bracket 30 has an upper hinging point 31 and a lower hinging point 32 (FIGS. 4 and 5).

Figure 6:
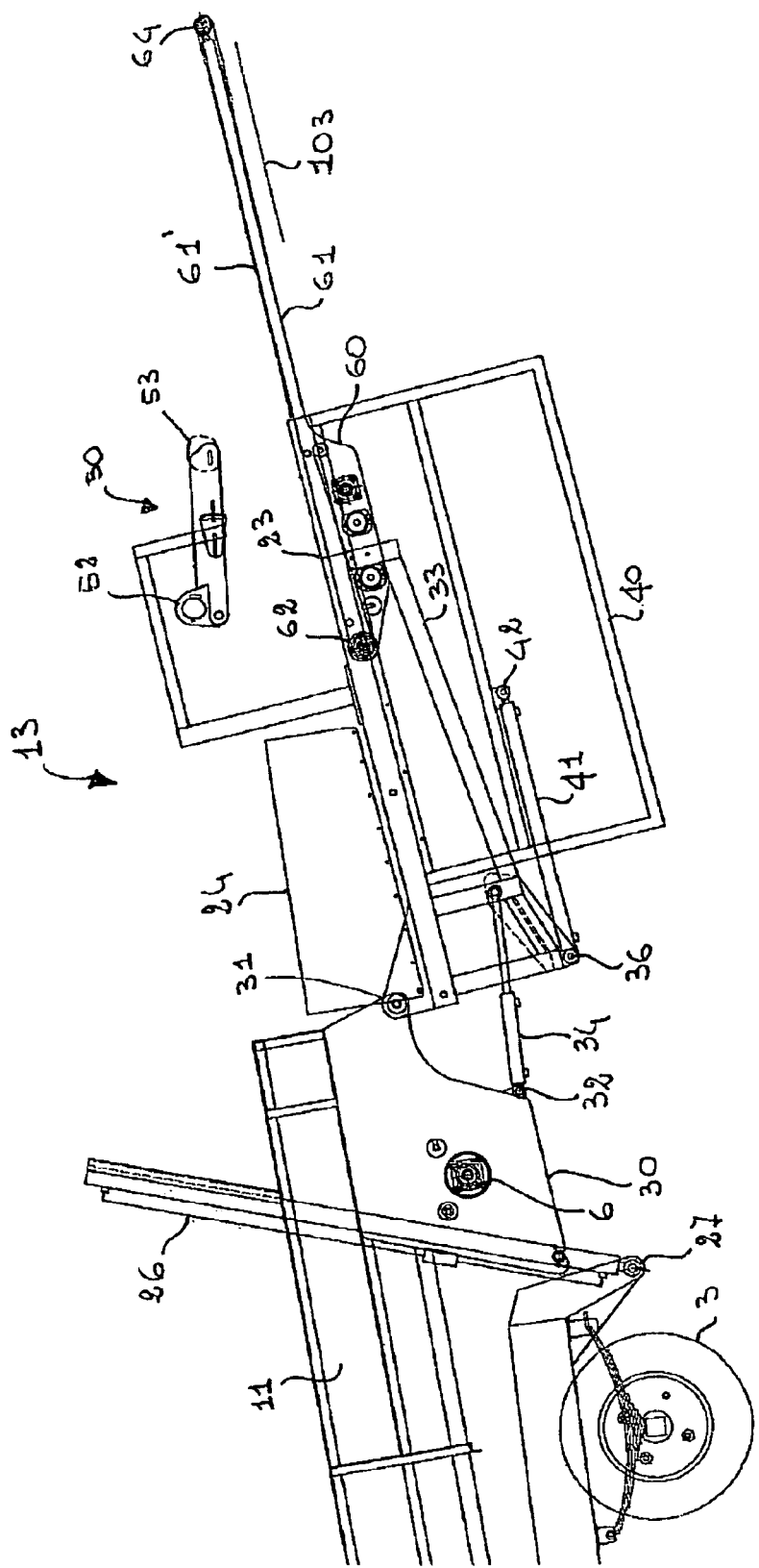
FIG. 6 is a schematic side view of the front end of the machine according to FIG. 3 inclined upwards and with the loading belt extracted.
Figure 11:
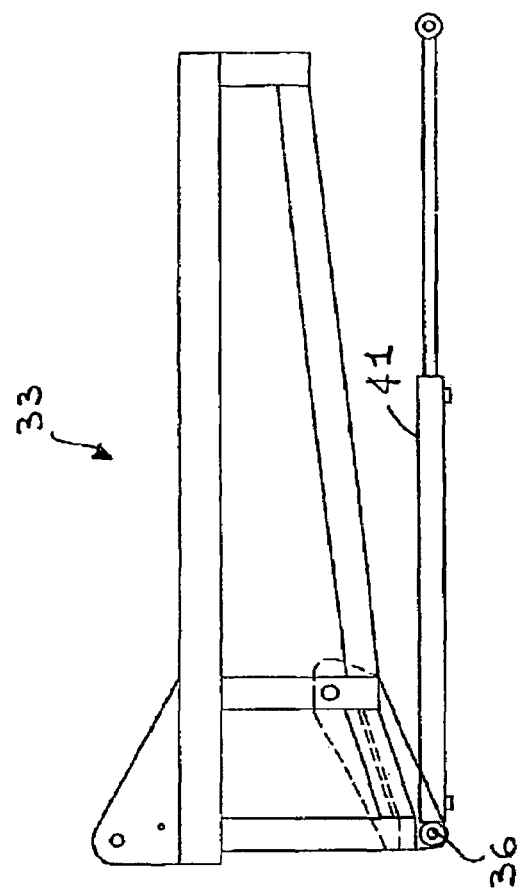
FIG. 11a is a front plan view of the pivoting frame.
FIG. 11b is a side plan view of the pivoting frame.
Figure 11:
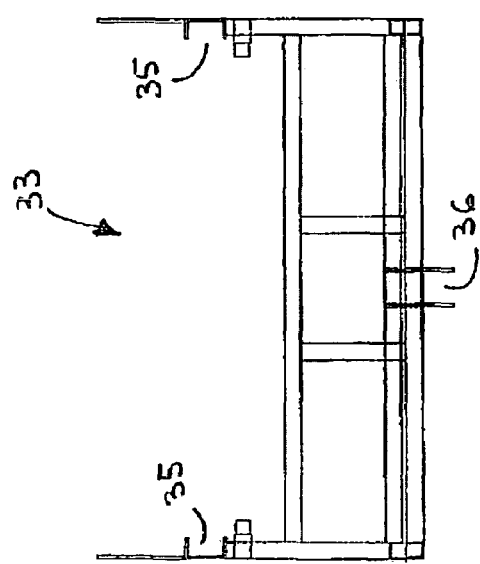

A pivoting frame 33 is pivotably hinged on the shaped brackets 30 at their upper hinging points 31. The end of an oil-hydraulic pivoting piston 34 for changing the inclination of the pivoting frame is pivotably mounted on each of the bottom hinging points 32 of the shaped brackets (FIGS. 4, 5 and 6). The other end of the pistons 34 is fixed to the pivoting frame 33. Therefore, the actuation of the pistons 34 allows the rotation (or inclination) of the pivoting frame 33 about the axis passing through the upper hinging points 31 of the shaped brackets 30. The use of this movement will become clear below. The pivoting frame 33 is also shown in FIGS. 11a and 11b. The pivoting frame 33 also defines two parallel guides 35.

A frame 40, called "cabin support frame" or "approach frame", is supported by the pivoting frame 33. For the sake of clarity, the cabin 39 is shown only in FIG. 1. Obviously, a simple platform for supporting operators while they supervise the loading of the birds and operate the controls (not shown) could be envisaged in place of the cabin. The approach frame 40 is shaped so that it may be engaged inside the parallel guides 35 of the pivoting frame 33. In this way, the cabin support frame 40 is slidable telescopically with respect to the pivoting frame 33. In a retracted position (see, for example, FIG. 4). The cabin support frame 40 projects forwards slightly from the pivoting frame 33. The travel movement of the cabin support frame 40 is about 110 cm.

Figure 8:
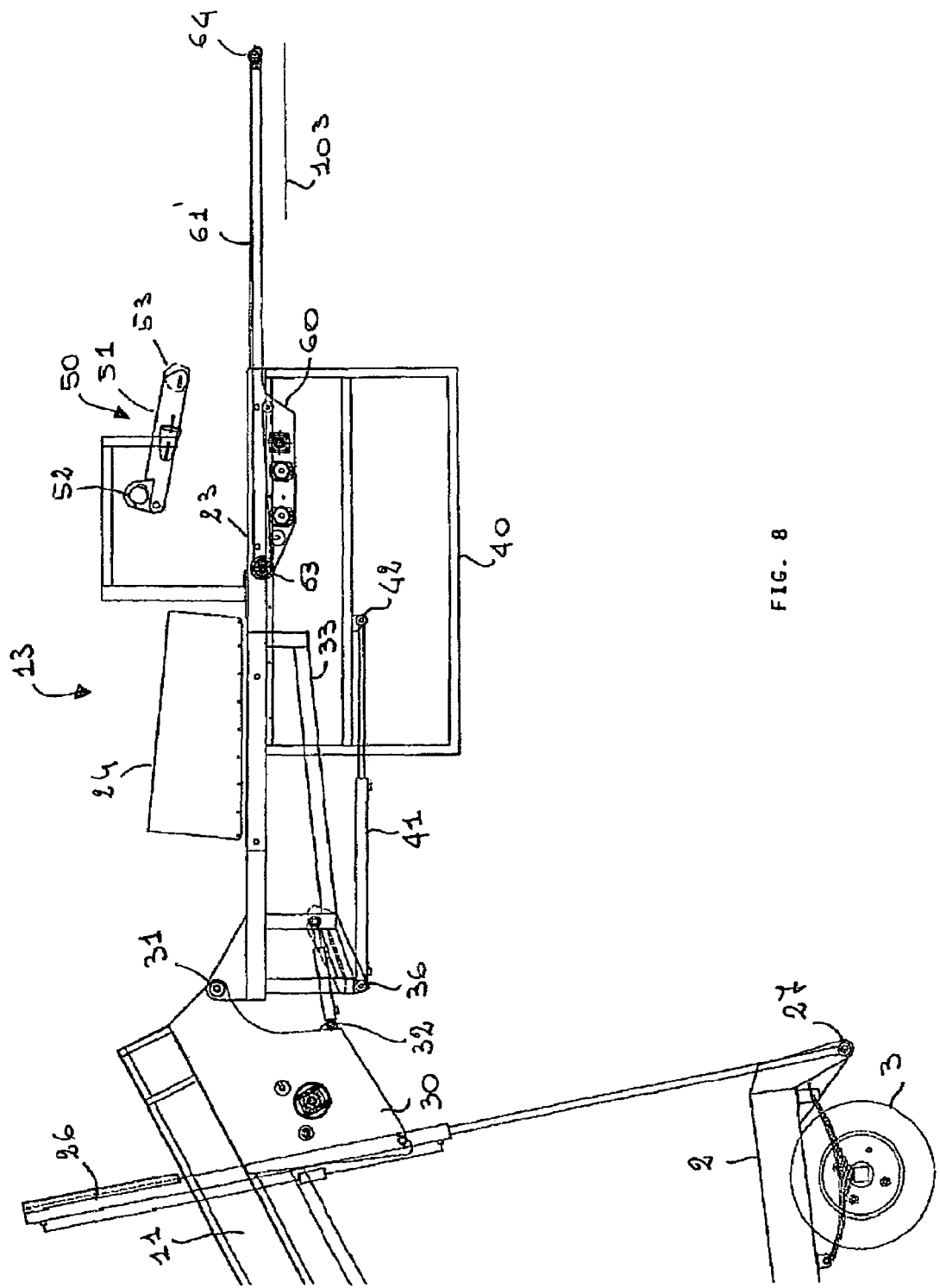
FIG. 8 is a schematic side view of the front end of the machine according to FIG. 7.
Figure 9:
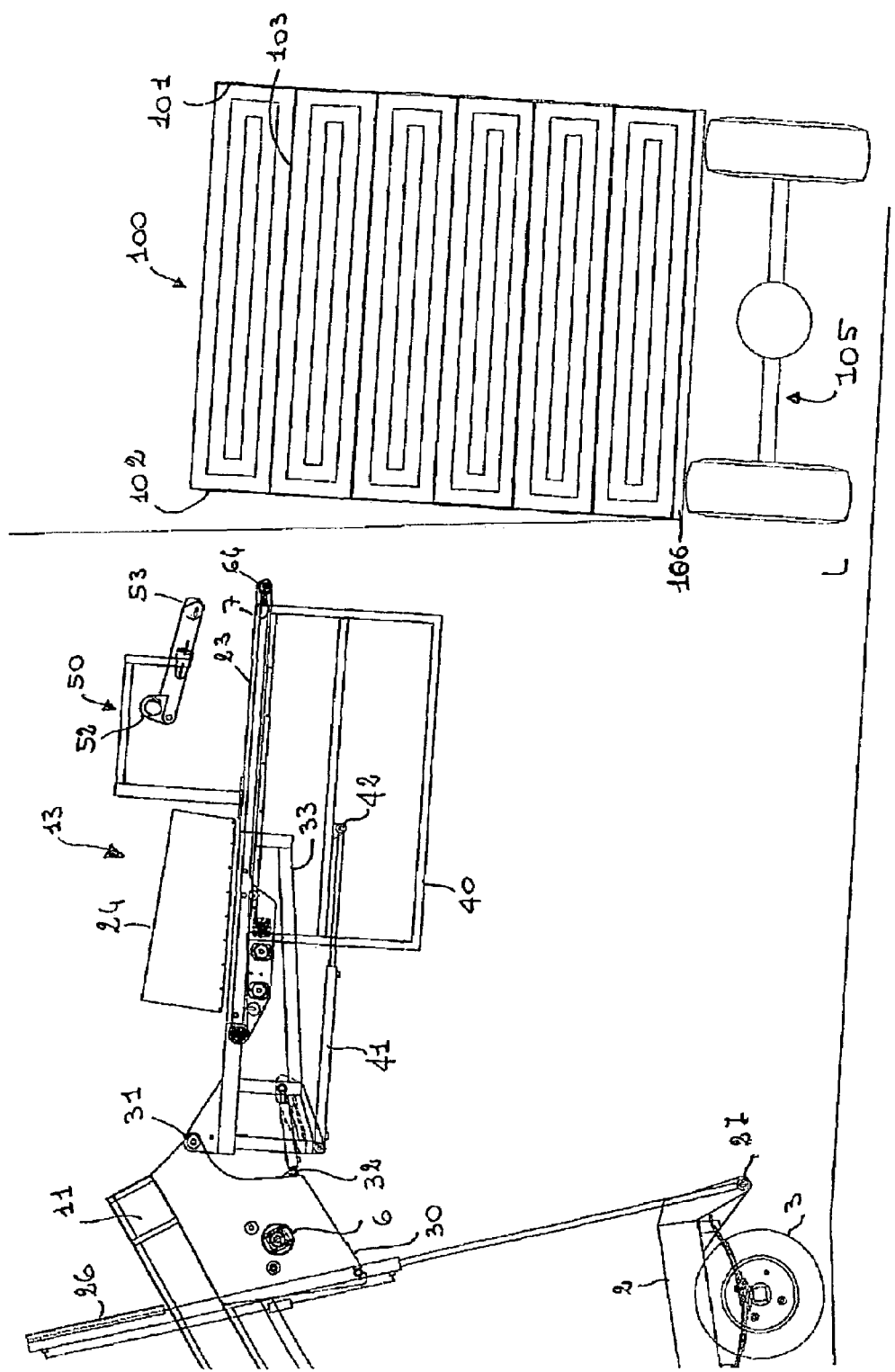
FIG. 9 is a schematic side view of the front end of the machine according to FIG. 7 in the downwardly inclined position, with the loading belt retracted and with the approach frame partly extracted towards the cages.
Figure 10:
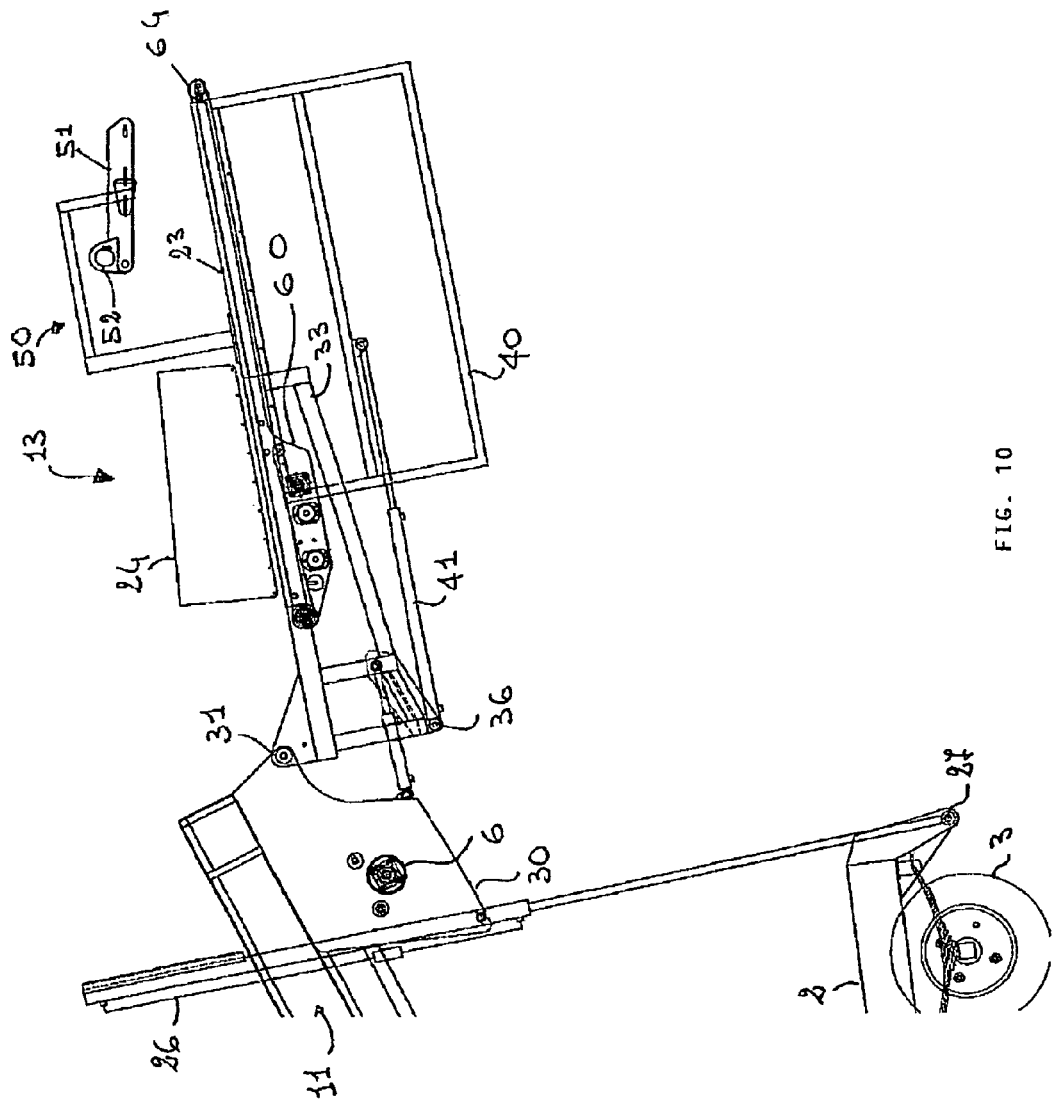
FIG. 10 is a schematic side view of the front end of the machine according to FIG. 7 in an upwardly inclined position, with the loading belt retracted and with the approach frame partly extracted.

The cabin support frame is shown in an extended position, for example in FIG. 8. The backward or forward movement of the cabin support frame 40 with respect to the pivoting frame 33 is controlled by an oil-hydraulic approach piston 41 (which can be seen in various figures and also in FIG. 11b). One end of the approach piston 41 is pivotably mounted on the pivoting frame 33 at 36; the other end of the approach piston 41 is pivotably mounted on the cabin support frame 40 at 42. The approach piston 41 and the pivoting pistons 34 are in fluid connection so as to keep always the front end 13 at a set distance from a stack of cages. Conveniently, the distance set when the front end is in its lowermost position is thus maintained, causing it to move upwards in order to fill the highest most cages in the stack. Without this arrangement, the front end, when moving upwards, would tend to move away from the stack of cages.

As mentioned above, the balancing pistons 22 ensure that the inclination of the front end does not change, raising the front end by means of the raising pistons 26 in order to fill the highest cages in the stack. Without the balancing pistons 22, the front end, when moving upwards, would tend to change its inclination with respect to the bottom surface of the cages.

An upper frame 50 is fixed to the approach frame 40 and supports an upper belt 51. The upper belt 51 is wound endlessly between a driving roller 52 and an idle roller 53. Conveniently, the upper belt 51 is inclined and favours the entry of the birds into the cages 100, as will be clarified below. The fact that the frame 50 is fixed to the approach frame 40 is advantageous since, when the approach frame 40 is displaced towards the cages, the upper belt also moves towards the entrance of the cages and does not allow the birds to raise their heads before entering into the cage.

Figure 13:
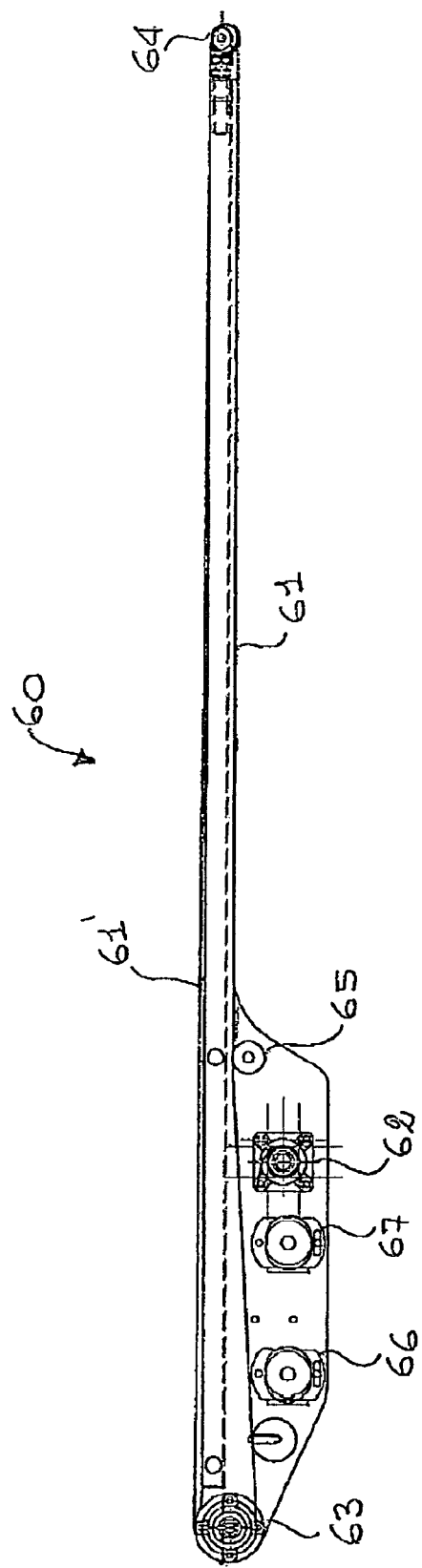
FIG. 13 is a side plan view of the frame of the loading belt.
Figure 14:
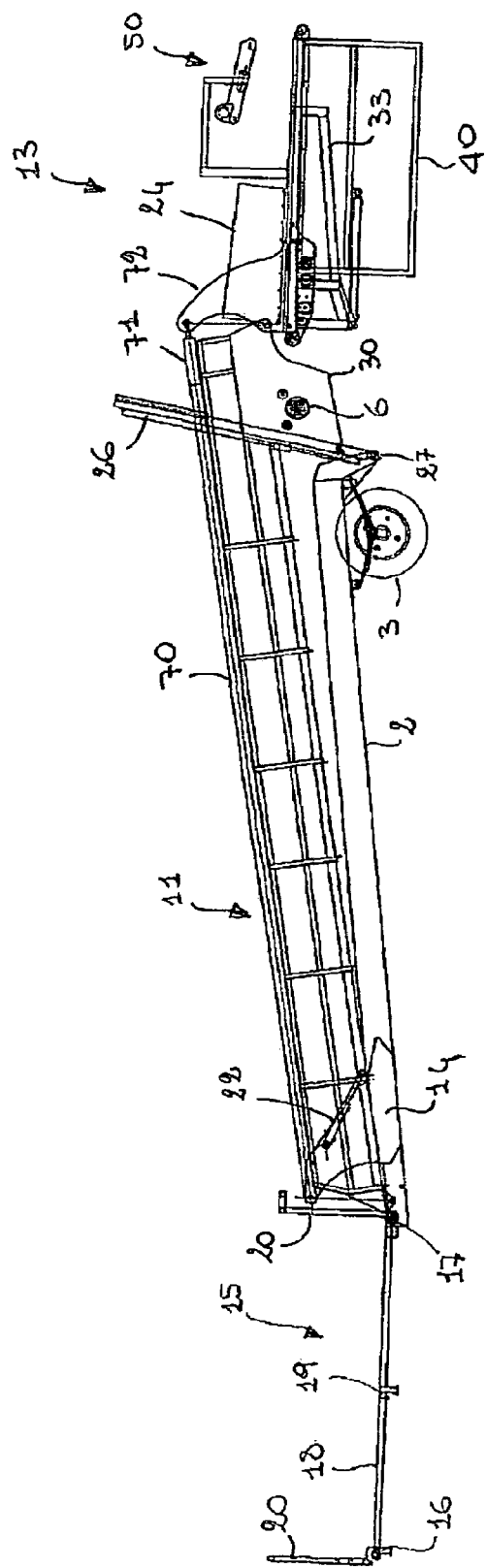
FIGS. 14 to 21 correspond to FIGS. 3 to 10, but relate to a second embodiment of the machine.
Figure 15:
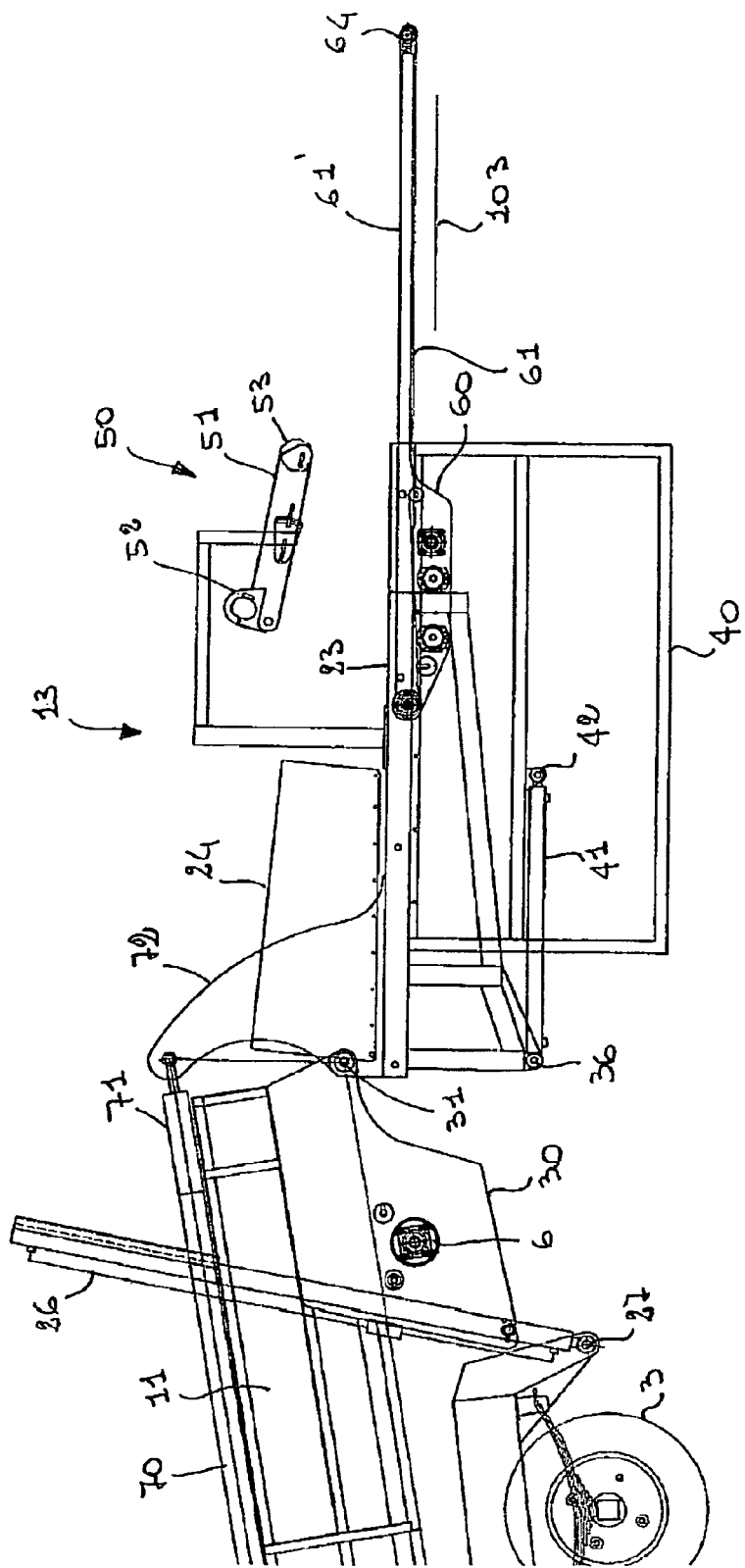
Figure 16:
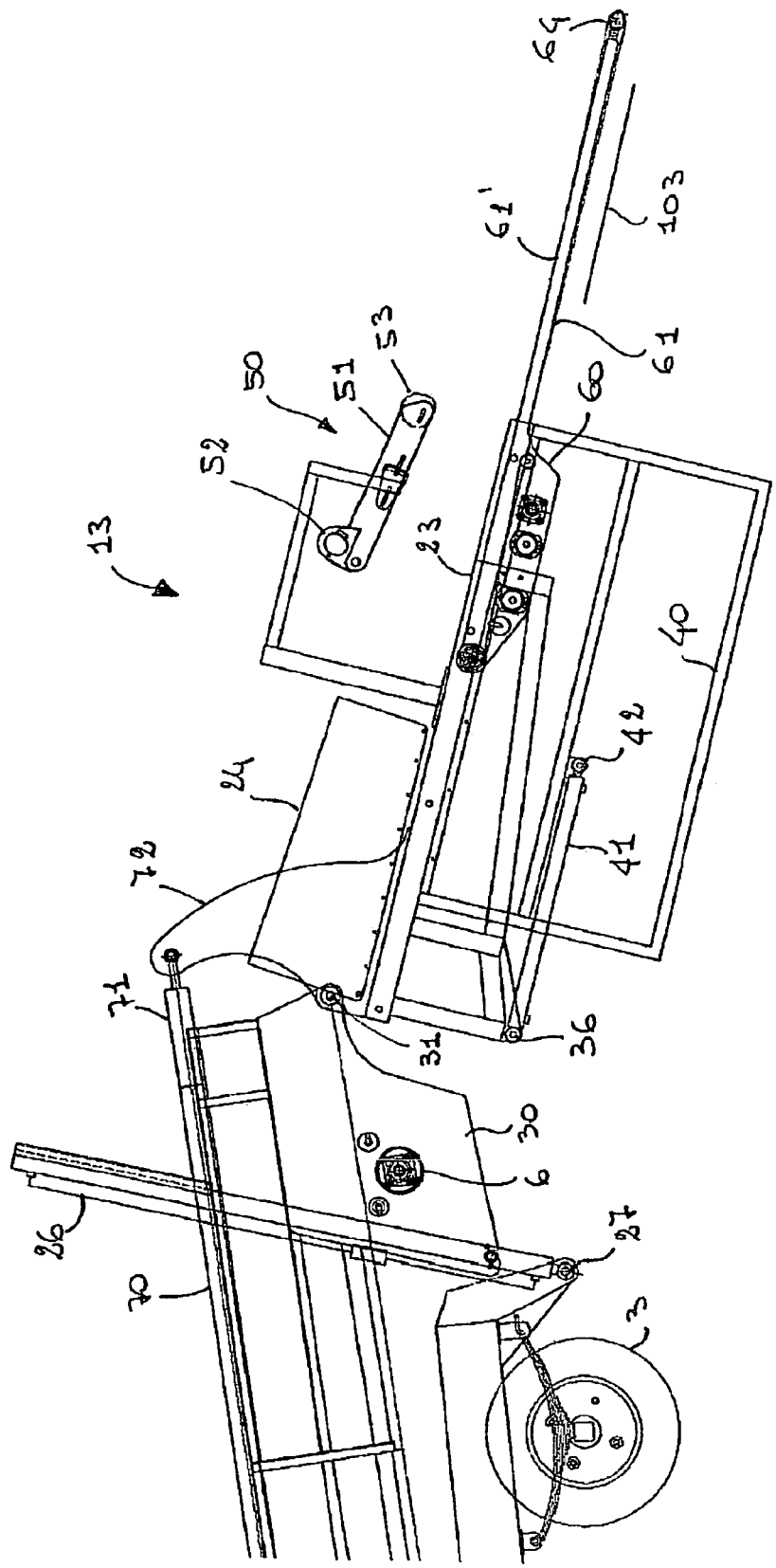
Figure 17:
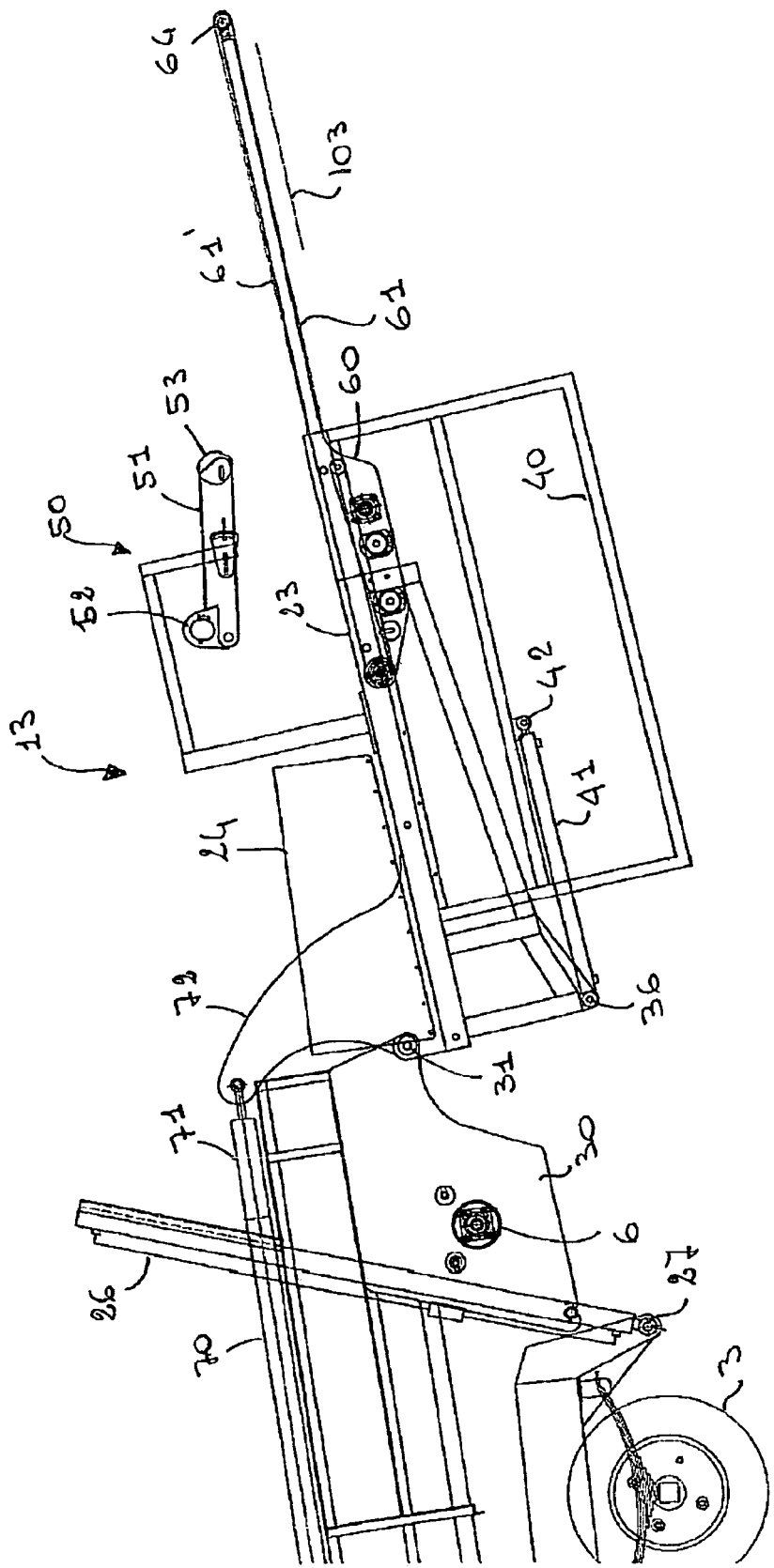
Figure 18:
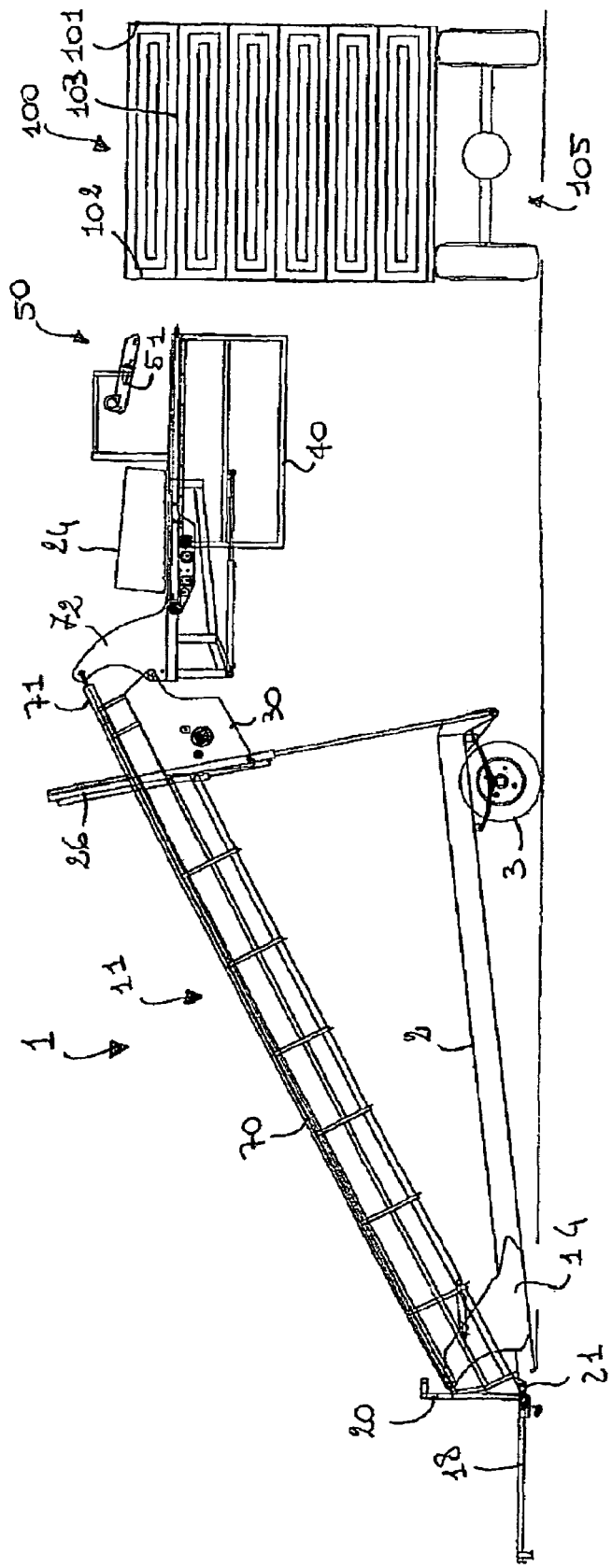
Figure 19:
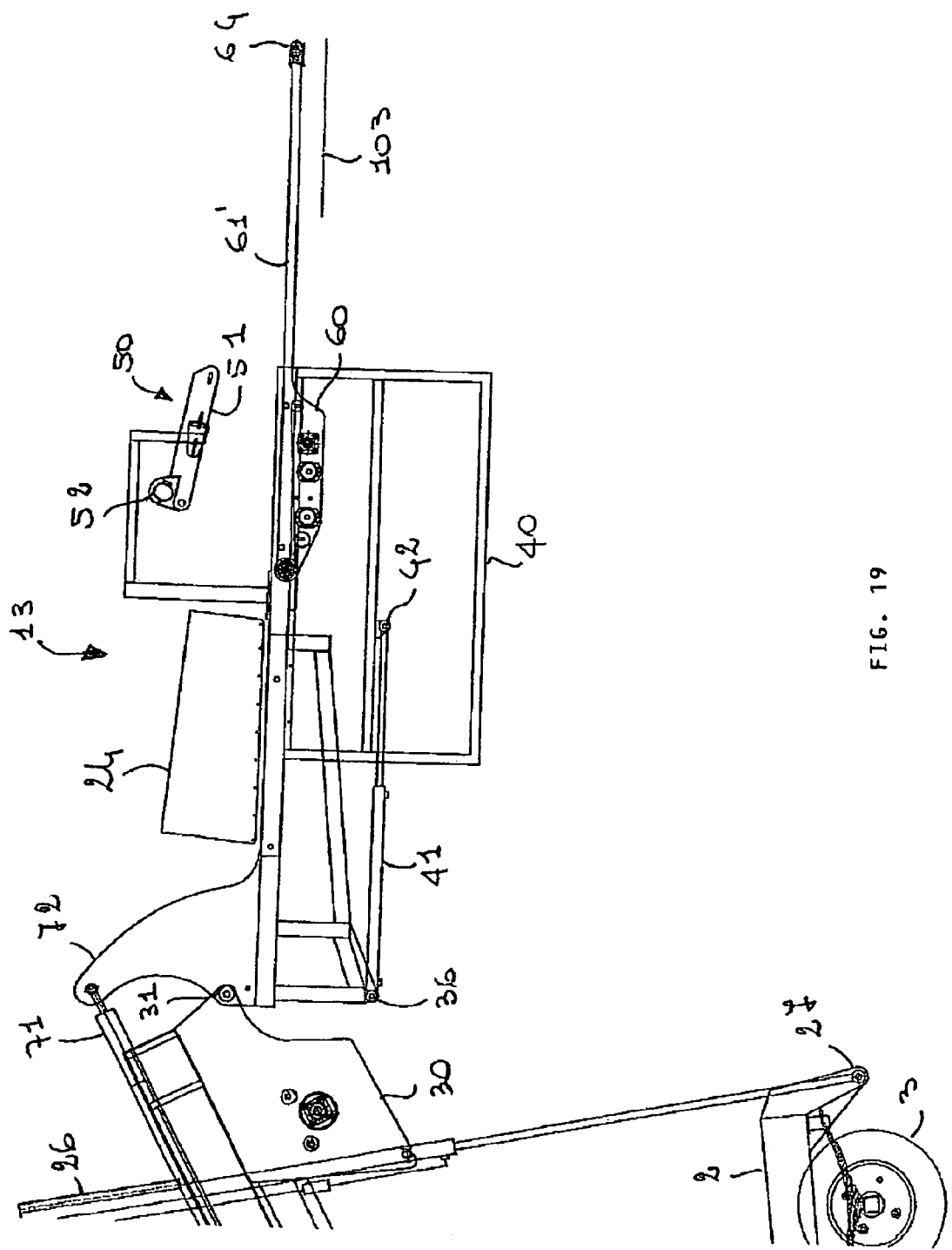
Figure 20:
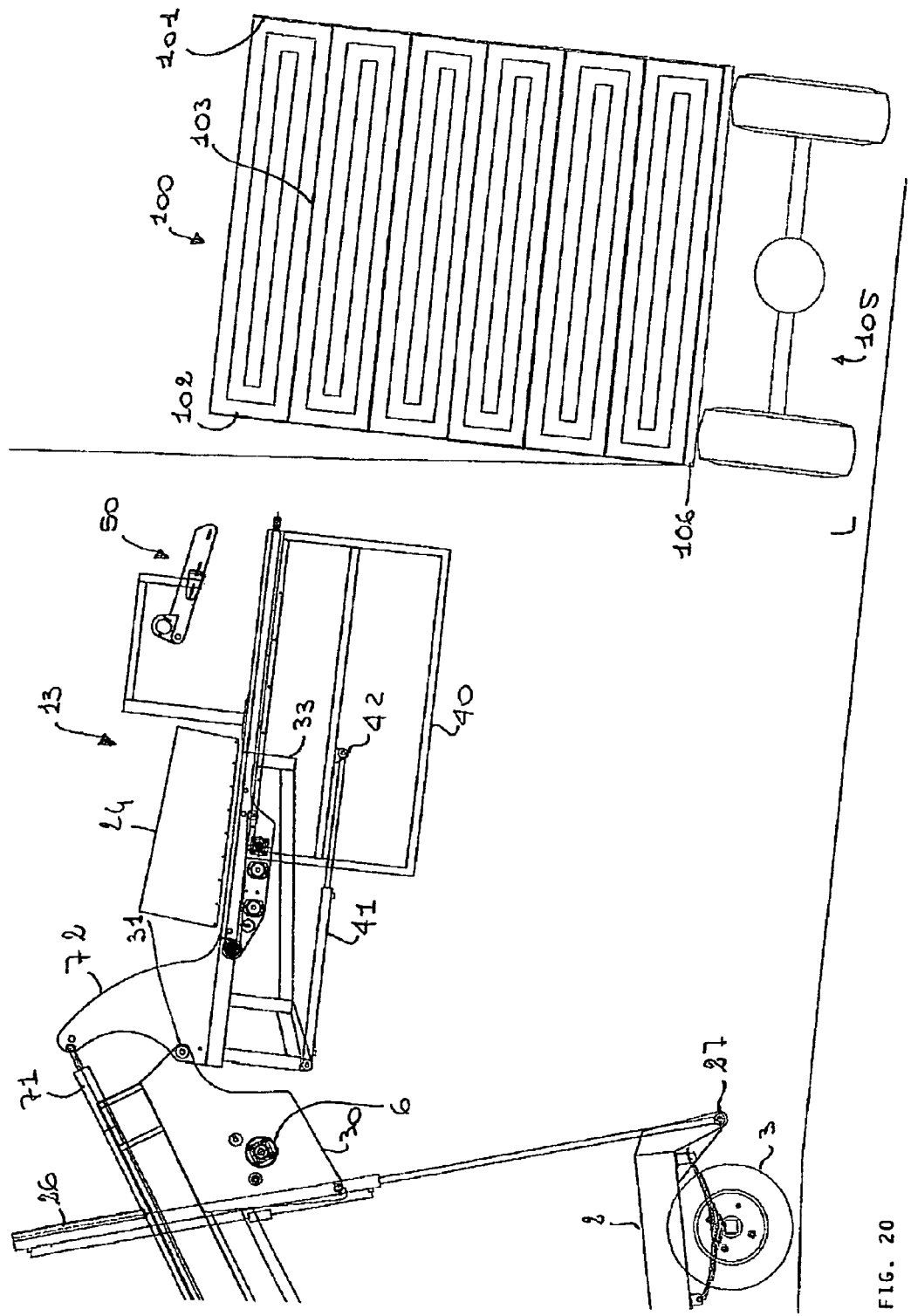
Figure 21:
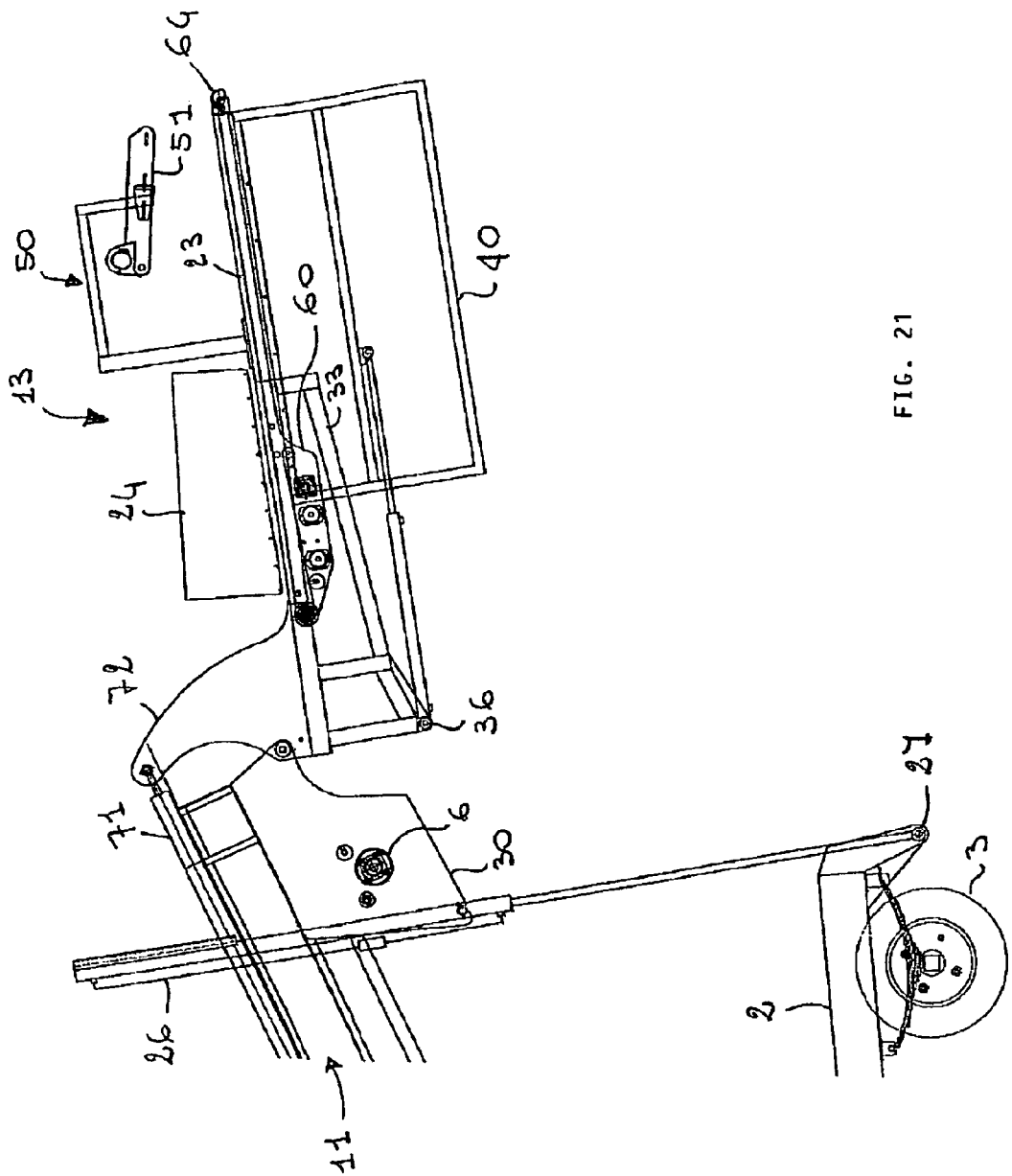
Figure 22:
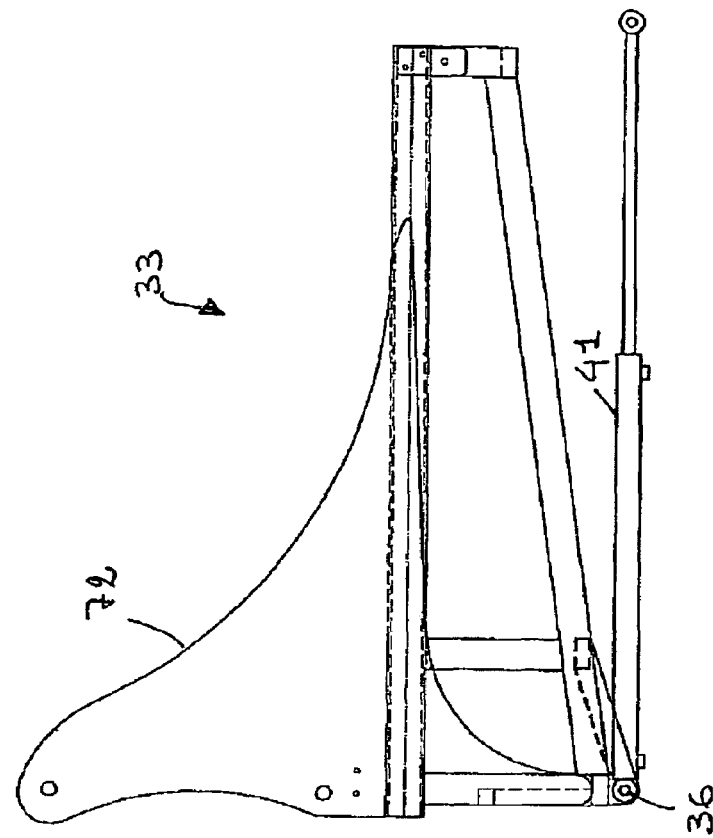
FIGS. 22a and 22b correspond to FIGS. 11a and 11b, but relate to the second embodiment of the machine.
Figure 22:
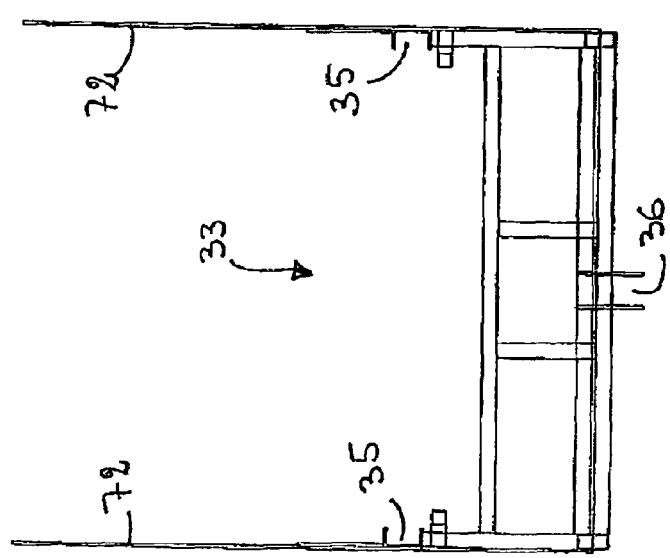

A frame 60 of a cage loading belt (also more simply referred to as "loading belt 61") is supported in a displaceable manner by guides 45 defined by the cabin support frame 40. Conveniently a rack system 46 (schematically shown in FIGS. 12a and 12b) and gear wheel 62 (FIG. 13) is provided for each guide 45. The loading belt frame 60 is shown in plan view in FIG. 13. The loading belt 61 is wound endlessly between a driving roller 63 and an idle roller 64, passing through any transmission rollers 65. A hydraulic motor 66 allows rotation of the driving roller 62 and the revolving movement of the belt 61. Another hydraulic motor 67 causes rotation of a pair of gear wheels (only one of which is shown in FIG. 13) which cooperate with the racks 46 fixed to the guides 45 of the cabin support frame 40 so as to cause the loading belt 61 to protrude in front of the cabin support frame 40 or so as to retract it inside it.

By way of example, according to a second embodiment, the loading belt 61 has a travel stroke of about 150-200 cm, i.e. is able to project in front of the cabin support frame 40 by about 150-200 cm. The loading belt 61 is able, as will be explained better below, to enter into cages 100 in the vicinity of the bottom 103 thereof (in some figures only the bottom 103 of the cages is shown). Owing to the long travel stroke of the loading belt 61, it may also be inserted into double-depth cages over a fairly long distance until nearly the wall 101 of the cage 100 opposite that of the opening 102 is reached.

Following a description of the structure of the machine 1 according to the invention, operation of the latter will now be described with reference to FIGS. 3-10 which show the machine according to the first embodiment in various working positions.

Let us assume that a lorry 105 for transporting poultry has parked close to the front part or end 13 of the poultry-loading machine 1. The lorry (or a trailer hitched to it or any other transportation means, for example a shunting truck) has a platform 106 on which stacked cages 100 able to contain the poultry are arranged. Conveniently, the cages 100 have a double width and may also be loaded on only on one side L of the lorry. It is also known to those persons who work in the poultry sector that, typically, the open areas where the operation of loading the birds into the cages situated on the lorry and/or on its trailer is performed are not perfectly flat. Generally the ground is very rough and therefore the platform 106 is more or less inclined. Consequently, the bottom 103 of the cages 100 is inclined.

It is not necessary that the lorry should be parked exactly next to the front end 13 of the machine 1. In fact, it is sufficient for it to be positioned at a distance from it such that it may be reached by the cabin support frame 40. In other words, once the lorry has moved close to the poultry-loading machine 1 (in particular the cabin support frame 40), the approach frame 40 may be extracted from the pivoting frame 33 so as to be positioned exactly opposite the openings 102 of the cages. The extraction of the cabin support frame 40 is performed by means of the oil-hydraulic piston 41. Generally, the approach movement is performed initially with the front end in its lowest position (FIG. 3).

Once it is in this position, the inclination of the pivoting frame 33 (and therefore also the cabin support frame 40 and the frame 60 of the loading belt 61) is varied. This is performed by operating the pistons 34 (FIGS. 5 and 6). The pivoting frame 33 is rotated with respect to the upper hinging points 31 of the shaped brackets 30. The inclination of the pivoting frame 33 is varied so that the surface 61' defined by the loading belt 31 is parallel to the bottom 103 of the cages 100.

When the surface 61' of the loading belt 61 is parallel to the bottom 103 of the cages 100, the loading belt 61 is introduced into a cage 100 and extended towards the part opposite the opening 102. The loading belt is shown extracted in FIG. 4. The frame 60 and the associated loading belt 61 are extracted by causing the rotation, via the hydraulic motor 67, of the gear wheels 62 which cooperate with the racks 46 of the approach frame 40.

In this position loading of the poultry into the cage may be performed. The pick-up belt 18, the conveyor belt 5 and the loading belt 61 are activated. The birds are induced to mount the pick-up belt 18 and are thus transported, passing inside the conveying channel 11, to the top of the machine 1; they then continue along the section 23 of the conveyor belt 5. In order to facilitate their entry into the cages 100, the upper belt 51 is also activated, this creating a sandwich effect and forcing the birds to duck and lower their heads downwards. The birds then continue onto the loading belt 61 which is situated at least partly inside the cage 100. As the cage is gradually filled with birds, the operator operates the motor 67 backwards so that the loading belt 61 is retracted partly into the cabin support frame 40 so as to fill the part of the cage 100 which is closest to the entrance.

Once the cage has been filled, the machine is aligned with a second cage 100 which typically is situated above the cage just filled. For this purpose, the main frame 2 (and together with it the conveyor belt 5) are rotated upwards by suitably operating the raising pistons 26. As mentioned above, the front end is kept parallel to the stack of cages (i.e. moves upwards, keeping the same distance from the cages, initially set by the operator) by means of the pistons 34 and 41. Moreover, the front end is kept inclined in the same way as the bottom of the cages (set initially by the operator) by means of the balancing pistons 22. The balancing pistons 22 cooperate with the pistons 34. Once it is in the correct position, the loading belt 61 may be again introduced into another cage 100 in order to fill it with birds starting from the back.

FIGS. 14 to 21 and 22*a*, 22*b* show a second embodiment of the poultry-loading machine 1. The machine according to the second embodiment is very similar to that described above and a complete description thereof will be omitted. As for the first embodiment, each side of the machine is provided with a plate 14 fixed to the frame 2 and an oil-hydraulic balancing piston 22 pivotably mounted on the plate 14 and the conveying channel 11. The plate 14 also has, pivotably mounted on it, a bar 70 which runs adjacent to the wall of the conveying channel 11. The bar 70 terminates in an oil-hydraulic piston 71 which is pivotably mounted on an end plate 72. The end plate 72 is pivotably mounted on the shaped bracket 30 at the upper hinging point 31.

The inclination of the front end 13 is varied by means of the piston 71 so as to ensure that the surface of the loading belt is parallel to the bottom of the cages when the front end is in its bottom position (FIGS. 14-17). Once set, the desired inclination is maintained by means of the pistons 22 which cooperate with the pistons 71.

It is clear that, without the possibility, provided by the machine 1, of arranging the machine next to the lorry parked close to it, the loading operations would be decidedly more complicated. It should be remembered in fact that usually the birds are rounded up and introduced into the cages at night time and manoeuvring a lorry is for this reason more difficult. Moreover, the loading areas are often very restricted compared to the size of the lorries. For this reason also, manoeuvring the vehicles is complicated.

As mentioned above, the embodiments also offer the possibility of suitably adjusting the inclination of the front end 13. Conveniently, the inclination is adjusted so that the surface 61' of the loading belt 61 is parallel to the bottom 103 of the cages. The person skilled in the art will understand that, if this adjustment were not present and the lorry were not parked on a flat surface, it would not be possible to introduce the loading belt over a considerable distance. In fact, either the height of the entrance of the cage would be unacceptably small or the height of the cage at the end of the loading belt would be unacceptably small. In the first case, the birds would have much more difficulty in entering the cages. In the second case, the birds could not be loaded as far as the end of the cage and overcrowding would occur.

Loading of all the cages situated on a lorry may be performed on one side only. This is convenient because the loading times are extremely short. They are short simply because the lorry does not have to perform two maneuvres in order to perform loading on one side and then loading on the other side. The loading times are short also and in particular because opening the cages (often performed in dark, cold and rainy conditions) is a relatively long and awkward operation.

The double-depth cages are lighter than conventional cages and therefore allow loading of a lorry with less tare weight and a greater working load, making transportation more cost-effective. Moreover, they satisfy better the minimum space requirements for each animal.

We claim:

1. A poultry-loading machine adapted to guide poultry into a container, wherein the container has an opening and a bottom surface, wherein the machine comprises:
a main frame;
a first conveyor belt for transporting the poultry from a first position close to the ground into a second position, wherein said first conveyor belt is supported by said main frame; and
a second loading conveyor belt for transporting the poultry into said container, wherein said second loading conveyor belt defines a loading belt surface;
a device for modifying inclination of said second loading conveyor belt so that said loading belt surface is substantially parallel to the bottom surface of the container;
an approach frame which supports the second loading conveyor belt, said approach frame being adapted to move said second loading conveyor belt towards and away from said container, wherein said second loading conveyor belt is displaceable so as to enter, at least partly, into said container and to transport the poultry inside it;
a pivoting frame configured to be inclined with respect to said main frame and wherein said inclination modifying device also comprises at least one piston connected to said pivoting frame.

2. The machine according to claim 1, wherein said approach frame is movable telescopically with respect to said pivoting frame and wherein the machine also comprises at least one piston connected to said pivoting frame and to said approach frame for displacing said approach frame with respect to said pivoting frame.

3. The machine according to claim 1, further comprising at least one balancing piston arranged to cooperate with the piston connected to said pivoting frame so as to raise and lower said approach frame, keeping it parallel to a predetermined direction.

4. A poultry-loading machine adapted to guide poultry into a container, wherein the container has an opening and a bottom surface, wherein the machine comprises:
a first conveyor belt for transporting the poultry from a first position close to the ground into a second position, wherein said first conveyor belt is supported by said main frame; and
a second loading conveyor belt for transporting the poultry into said container, wherein said second loading conveyor belt defines a loading belt surface;
a device for modifying inclination of said second loading conveyor belt so that said loading belt surface is substantially parallel to the bottom surface of the container;
an approach frame which supports the second loading conveyor belt, said approach frame being adapted to move said second loading conveyor belt towards and away from said container, wherein said second loading conveyor belt is displaceable so as to enter, at least partly, into said container and to transport the poultry inside it;
wherein said second conveyor belt is supported by a support frame and wherein said support frame is movable telescopically with respect to the approach frame.

5. The machine according to claim 4, wherein said approach frame comprises at least one rack and wherein said support frame comprises at least one gear wheel cooperating with said at least one rack so as to move telescopically said second conveyor belt and the respective support frame with respect to said approach frame.

6. The machine according to claim 5, further comprising an oil-hydraulic motor for rotating said at least one gear wheel.

7. The machine according to claim 4, further comprising at least one piston for raising said first conveyor belt.

8. The machine according to claim 4, further comprising an upper belt for facilitating the entry of the birds into the container, said upper belt comprising an upper conveyor belt fixed to the approach frame.

9. The machine according to claim 4, wherein said container is a container having a depth which substantially corresponds to a width of a lorry.

10. A poultry-loading machine adapted to guide poultry into a container, wherein the container has an opening and a bottom surface, wherein the machine comprises:
   a main frame;
   a first conveyor belt configured to transport the poultry from a first position close to the ground into a second position, wherein said first conveyor belt is supported by said main frame; and
   a second loading conveyor belt configured to transport the poultry into said container, wherein said second loading conveyor belt being configured to define a loading belt surface;
   a device for modifying inclination of said second loading conveyor belt so that said loading belt surface is substantially parallel to the bottom surface of the container; and
   an approach frame configured to support the second loading conveyor belt, said approach frame being adapted to move said second loading conveyor belt towards and away from said container, wherein said second loading conveyor belt is displaceable so as to enter, at least partly, into said container and to transport the poultry inside it;
   a pick-up conveyor belt configured to pick up poultry birds from the ground, said pick-up conveyor belt being arranged upstream of said first conveyor belt;
   wherein said pick up conveyor belt is configured to be folded up hingeably about an axis transverse to the longitudinal axis of the pick up conveyor belt.

* * * * *